United States Patent
Bekmambetov et al.

(10) Patent No.: US 10,319,059 B1
(45) Date of Patent: Jun. 11, 2019

(54) GIF FILE WITH HIDDEN IMAGES AND SELECTABLE PLAYBACK THAT IS ACTIVATED BASED ON A USER ID

(71) Applicant: Screenshare Technology Ltd., Nicosia (CY)

(72) Inventors: Timur Bekmambetov, Moscow (RU); Yanis Onkes, Washington, DC (US)

(73) Assignee: Screenshare Technology Ltd., Nicosia (CY)

( * ) Notice: Subject to any disclaimer, the term of this patent is extended or adjusted under 35 U.S.C. 154(b) by 0 days.

(21) Appl. No.: 15/832,349

(22) Filed: Dec. 5, 2017

Related U.S. Application Data

(60) Provisional application No. 62/429,943, filed on Dec. 5, 2016.

(51) Int. Cl.
    *G06T 1/00* (2006.01)

(52) U.S. Cl.
    CPC .......... *G06T 1/0085* (2013.01); *G06T 1/0028* (2013.01); *G06T 1/0071* (2013.01); *G06T 2201/0052* (2013.01)

(58) Field of Classification Search
    None
    See application file for complete search history.

(56) References Cited

U.S. PATENT DOCUMENTS

2017/0330363 A1* 11/2017 Song ..................... G06K 9/481

* cited by examiner

*Primary Examiner* — Idowu O Osifade
(74) *Attorney, Agent, or Firm* — Bardmesser Law Group

(57) ABSTRACT

A method and computer product for inserting additional frames into a ".GIF" file or modifying existing frames that can only be visible by recipients of the ".GIF" file satisfying a certain criteria are provided. A proprietary applications extension for ".GIF" file format allows for playing different images sequences within the same ".GIF" file to a recipient using a proprietary viewer application. The proprietary viewer application extension for ".GIF" file format allows for playing different image sequences in the ".GIF" viewer. A frame modification extension module contains sequence of images (in a binary form) and identifications that the proprietary ".GIF" viewer (with special extension logic) can substitute some of the "GIF's" image data while playing the file. Thus, the ".GIF" viewer is able to play different images (i.e., hidden embedded frames) than the ones played by a standard ".GIF" viewer to a certain recipient.

7 Claims, 3 Drawing Sheets

GIF FILE WITH HIDDEN IMAGES AND SELECTABLE PLAYBACK THAT IS ACTIVATED BASED ON A USER ID

CROSS-REFERENCE TO RELATED APPLICATIONS

This application is a non-provisional of US Provisional Patent Application No. 62/429,943, filed on Dec. 5, 2016, incorporated herein by reference in its entirety.

BACKGROUND OF THE INVENTION

Field of the Invention

The invention relates to sharing ".GIF" files over a network, and, more particularly, to an efficient method for inserting or modifying frames inside the ".GIF" files are only visible to specified recipients.

Description of the Related Art

The industry trend of sharing short videos or animations in a form of ".GIF" files presents some challenges in terms of sharing data among users. If the ".GIF" file is generated, all the frames within the file are visible to any recipient who receives or downloads this file. Even if some frames are added or the existing frames are modified by a user or an application, all other users can see these changes and modifications. Conventional ".GIF" players do not provide for separation or allocation of certain ".GIF" frames to a particular recipient or a set of recipients. Yet, some users may want to insert frames or modify the existing frames of the ".GIF" file with a condition that these frames are only visible to their friends, family, co-workers, specific people selected based on business considerations, etc.

Accordingly, it is desired to have an efficient method for adding or modifying existing frames of a ".GIF" file in such a manner that the modifications are only available to certain users.

SUMMARY OF THE INVENTION

The invention relates to sharing ".GIF" files over a network, and, more particularly, to an efficient method for inserting or modifying frames inside of the ".GIF" files that can only be visible by specified recipients, that substantially obviates one or more disadvantages of the related art In one aspect, a method and computer product for inserting additional frames into a ".GIF" file or modifying existing frames that can only be visible by recipients of the ".GIF" file satisfying a certain criteria are provided. According to an exemplary embodiment, a proprietary applications extension for ".GIF" file format allows for playing different images sequences within the same ".GIF" file to a recipient using a proprietary viewer application.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
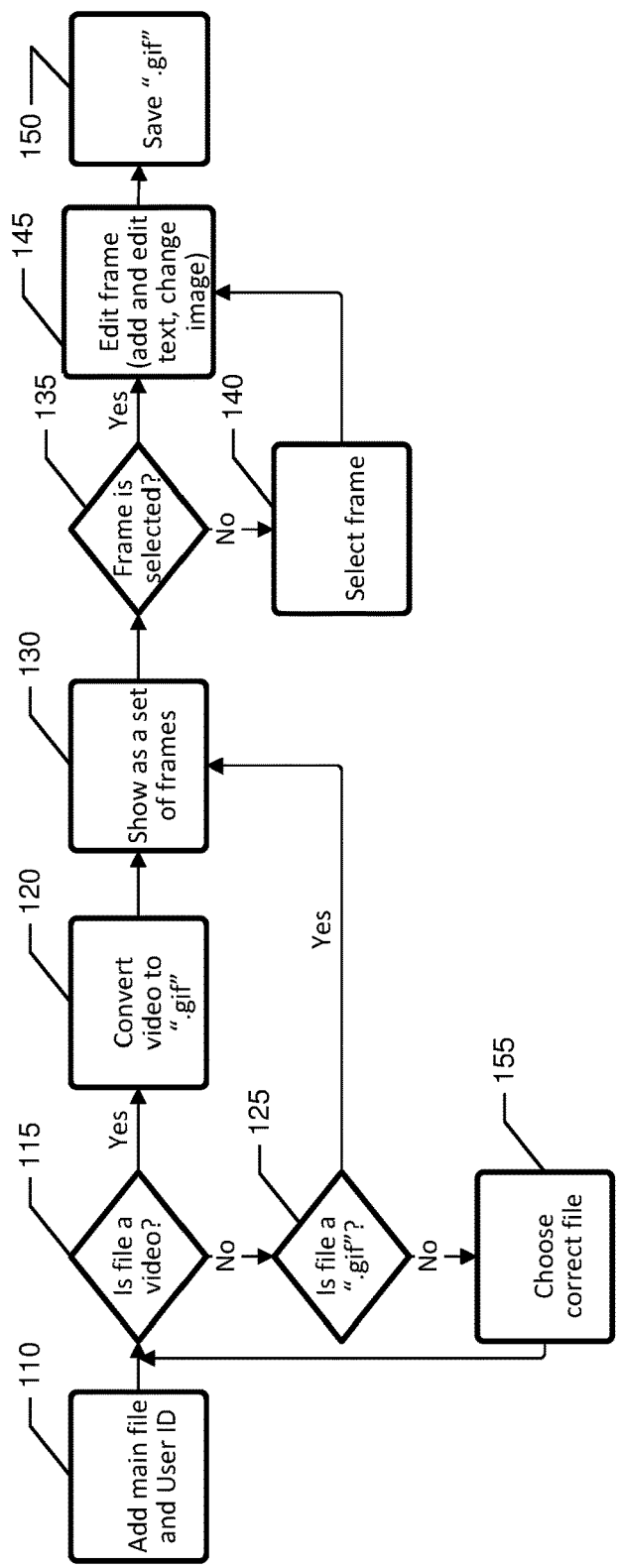
FIG. 1 illustrates a flowchart for generation of a ".GIF" with at least one modified frame, in accordance with the exemplary embodiment.

Reference will now be made in detail to the preferred embodiments of the present invention, examples of which are illustrated in the accompanying drawings.

In one aspect, a method and computer product for inserting additional frames into a ".GIF" file or modifying existing frames that can only be visible by recipients of the ".GIF" file satisfying certain criteria are provided. According to an exemplary embodiment, a proprietary application extension for ".GIF" file format allows for playing different image sequences within the same ".GIF" file to a recipient using a proprietary viewer application. The proprietary viewer application extension for ".GIF" file format allows for playing different image sequences in the ".GIF" viewer depending on the recipient. The ".GIF" file format represents an image or sequences of images.

According to the exemplary embodiment, a frame modification extension module is embedded in the ".GIF" file format. The frame modification extension module contains a sequence of images (in a binary form) and identifications that the proprietary ".GIF" viewer (with special extension logic) can substitute the "gif's" image data while playing the file. Thus, the proposed ".GIF" viewer is able to play different images (i.e., hidden embedded frames) than the ones played by a standard ".GIF" viewer.

According to the exemplary embodiment, a "selectable playback" application extension includes the following elements:

- extension introducer (e.g., 0x21);
- extension label (e.g., 0xF9);
- block size;
- application identifier (ID);
- application authentication code (e.g., "2.0");
- sub-blocks are defined by a number of bytes of data in the sub-block, which begins with source category (IP address, some website shortnames), user identifier (IP address itself, ID number of user profile, etc.), and continues with the bytes to be substituted by the sub-block data in the ".GIF" image data block and by a color table for the following application extension data sub-block;

To the standard structure of a GIF application extension, we then add source category and source identifier into application extension (defining a person, a device or an account for which the frame is substituted in the ".gif" file from sub-blocks data; It can be added into the Data sub-block, and can use i—IP address category, 192.0.0.0—IP address itself, f—facebook category, 123123123—facebook ID itself);

block terminator.

According to the exemplary embodiment, the ".GIF" file is generated by a generator (either local or on a server). The generator includes the application extension with a substitute image data residing in the sub-blocks. When a regular viewer reads the modified ".GIF" file, the recipient is not able to see any difference from the original file. However, when the proprietary viewer reads modified (generated) ".GIF" file, it identifies the user who is viewing the file (by IP, facebook ID, some other metadata, etc. from a source identifier). Then, if the user is recognized as the one listed in the source identifier, the user is able to see a different image sequence taken (i.e., substituted) from the sub-blocks of the application extension.

According to the exemplary embodiment, the application extension includes the following:

1. 21 FF bytes indicating that this is the application extension;
2. Name of a user application, which uses the extension;
3. Bytes defining resource category (e.g., f—for Facebook, i—for IP address, t—Twitter, g—Google, etc.);
4. Resource identifier (e.g., Facebook id itself or IP address itself, 192.0.0.0—IP address itself, @username—Twitter id, 123123123—Facebook ID, etc.)
5. Sub block containing a substitute image data;
6. Bytes at the beginning of each sub block indicating an image size and a frame number within the animation, which needs to be replaced and the actual replacement image following these bytes. For example, at the beginning of each sub-block several bytes represent an image size and then several bytes representing frame number. These would refer to a particular image in image data, so the viewer will substitute that image from image data for the one from the application extension sub-block.

Note that several application extensions can be used simultaneously. After the original ".GIF" frames are modified (or new frames are added, the original ".GIF" is played back on a standard player in exactly the same manner. The added or modified frames can only be visible to a specified user in a proprietary ".GIF" viewer. The viewer can be a web based client-server application, a standalone desktop application, or a plug-in or extension for another application.

FIG. 1 illustrates a flowchart for generation of a ".GIF" with at least one modified frame, in accordance with the exemplary embodiment. In step 110, the main file is added with a user ID. If the file is a video in step 115, the process converts the file into ".GIF" in step 120. In step 130, the file is shown as a set of frames. Otherwise, if a file is in ".GIF" format in step 125, the process moves directly to step 130. If the file is not ".GIF" the process prompts user to choose a correct file in step 155. If a frame is selected in step 135, the process modifies the frame in step 145. If the frame is not selected in step 135, the process prompts the user to select the frame in step 140. The ".GIF" with modified frame(s) is saved in step 150.

Figure 2:
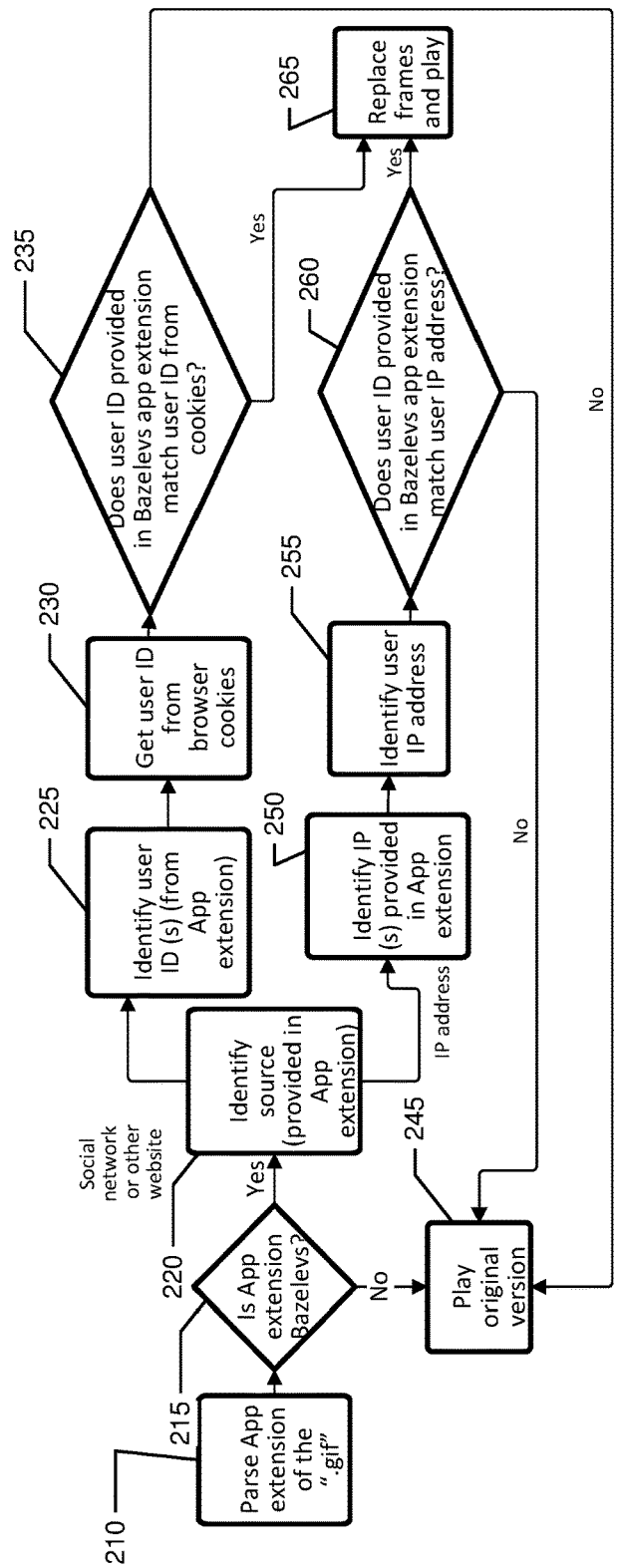
FIG. 2 illustrates a flowchart of a method used by a ".GIF" viewer application, in accordance with the exemplary embodiment.

FIG. 2 illustrates a flowchart of a method used by a ".GIF" viewer application, in accordance with the exemplary embodiment. The file generated in FIG. 1 is received by a user in the proprietary ".GIF" viewer extension (e.g., "Bazelevs", or some other designated proprietary extension). In step 210, the viewer extension parses the application extension of the ".GIF" file. If, in step 215, the application extension is "Bazelevs," the process identifies a source provided in the application extension in step 220. If, in step 215, the application extension is not "Bazelevs," the player plays the original version of the ".gif." In step 225, the process identifies user ID(s) from the application extension and acquires the user ID from browser cookies in step 230. If the user ID provided in Bazelevs application extension matches the user ID from the cookies in step 235, the process replaces the frame(s) in the original ".GIF" and plays it in step 265. Otherwise, the ".GIF" viewer plays the original ".GIF" in step 245.

In step 250, the process identifies the IP address provided in the application extension. The process acquires the IP address in step 255. If the user ID provided in Bazelevs application extension matches the user IP address in step 260, the process replaces the frame(s) in the original ".GIF" and plays it in step 265. Otherwise, the ".GIF" viewer plays the original ".GIF" in step 245. Thus, the specified users (having certain IDs) can view the modified or inserted frames within the original ".GIF" files, while other users can only see the original frames.

Figure 3:
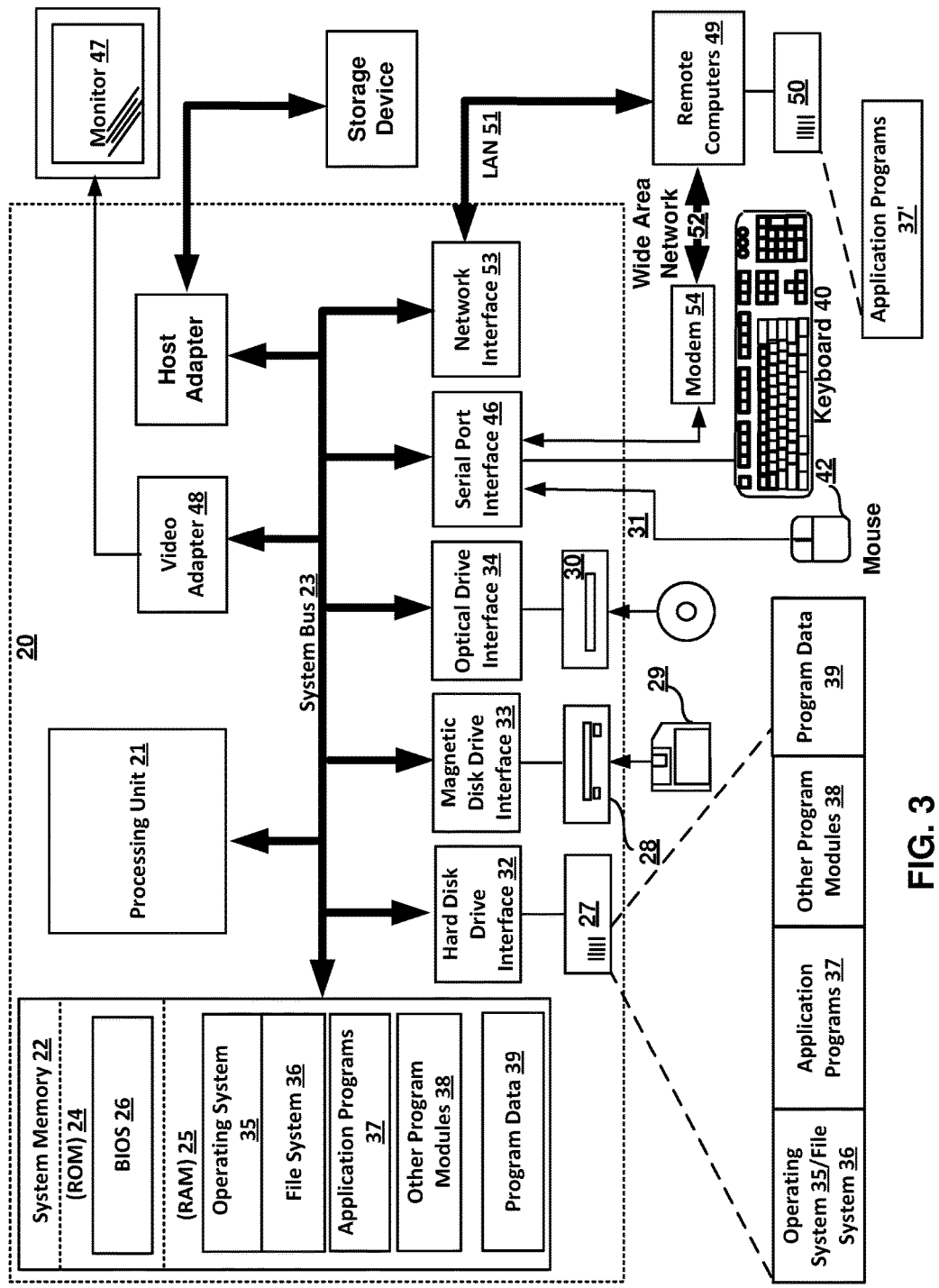
FIG. 3 illustrates a computer system or a server, which can be used in the exemplary embodiment.

With reference to FIG. 3, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for selective playback of an animation file, the method comprising:
launching a ".GIF" file viewer configured to playback the ".GIF" file;
parsing an application extension of the ".GIF" file by the ".GIF" file viewer;
identifying a recipient user ID from browser cookies or session variables or on-page identifications, if a "selectable frame" GIF application extension is detected;
replacing the selected frame by a substitute image and playing back the ".GIF" file to the recipient, if the user ID provided in the "selectable frame" matches the user ID acquired; and
playing back an original ".GIF" file, if the user ID provided in the "selectable frame" extension does not match the user ID acquired,
wherein
the video file was previously converted to a ".GIF" format representing the video file as a sequence of frames;
at least one frame was replaced by the substitute image; and
the video file was saved in ".GIF" format that includes "selectable frame" GIF application extension with the user ID embedded in it, before providing the ".GIF" file to a recipient user.

2. The method of claim 1, further comprising:
identifying a recipient user IP address, if the "selectable frame" GIF application extension is detected;
replacing the selected frame by a substitute image and playing back the ".GIF" file to the recipient, if the user ID provided in the data sub-blocks of "selectable frame" GIF application extension matches the user IP address; and
playing back an original ".GIF" file, if the user ID provided in the "selectable frame" GIF application extension does not match the user IP address.

3. The method of claim 1, wherein the sub-blocks of "selectable frame" GIF application extension includes at least one substitute image data for the replaced frame.

4. The method of claim 1, further comprising embedding the replaced frame inside an image data block from the "selectable frame" GIF application extension.

5. The method of claim 4, further comprising replacing the selected frame from the sub-blocks of "selectable frame" GIF application extension representing substitute image into the image data block of GIF file format.

6. A computer program product comprising a non-transitory computer readable medium containing code for implementing the steps of claim 1.

7. A system for playback of an animation file, the system comprising:
a processor configured to convert a video file to a ".GIF" format representing the video file as a sequence of frames;
the processor configured to receive a user identification;
the processor configured to select at least one frame to be swapped based on the user identification;
the processor configured to swap the selected frame for a substitute image;
the processor configured to save the video file in ".GIF" format which includes a "selectable frame" GIF application extension and providing the ".GIF" file to a recipient user;
wherein the video file is viewable in a ".GIF" file viewer configured to playback the modified ".GIF" file with the swapped frame after it (i) parses an application extension of the ".GIF" file by the ".GIF" file viewer, (ii) identifies a recipient user ID from browser cookies, session variables, in-page identifier, or IP address, if the "selectable frame" extension is detected, (iii) swaps the selected frame for the substitute image from sub-blocks of a "selectable frame" GIF application extension into image data block and playing back the ".GIF" file to the recipient, if the user ID provided in the "selectable frame" GIF application extension matches the user ID acquired from the browser cookies, session variables, in-page identifiers or IP address, and (iv) plays back an original ".GIF" file, if the user ID provided in the "selectable frame" GIF application extension is not present or does not match the user ID acquired from the browser cookies, session variables, in-page identifiers or IP address.

* * * * *